Oct. 15, 1940.  A. MARTELLUCCI  2,218,045
AUTOMATIC CASTING DEVICE FOR FISH RODS
Filed Jan. 31, 1940  2 Sheets-Sheet 1
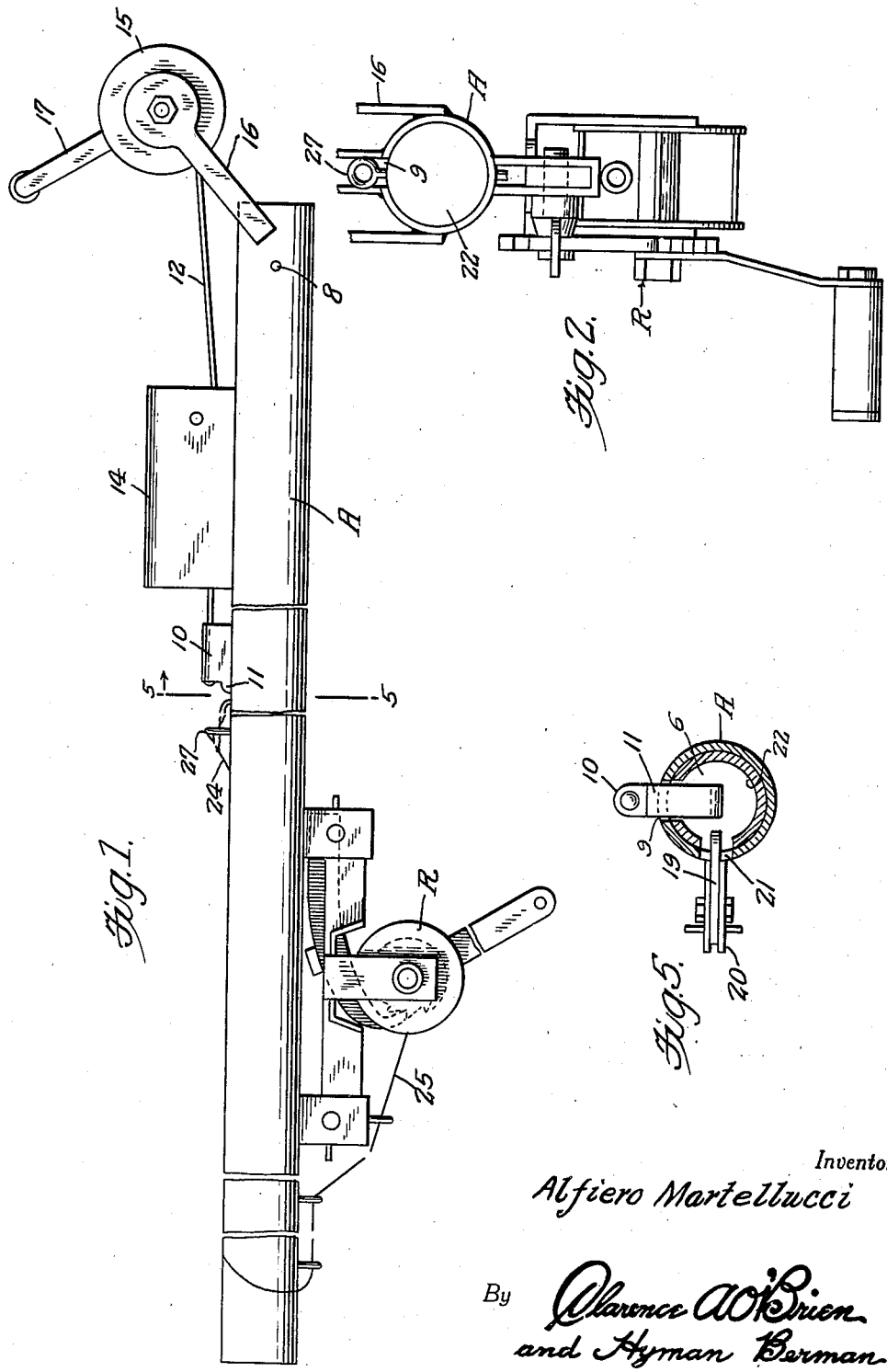
Inventor
Alfiero Martellucci
By Clarence A. O'Brien
and Hyman Berman
Attorneys Oct. 15, 1940.                A. MARTELLUCCI                2,218,045
                    AUTOMATIC CASTING DEVICE FOR FISH RODS
                       Filed Jan. 31, 1940            2 Sheets-Sheet 2
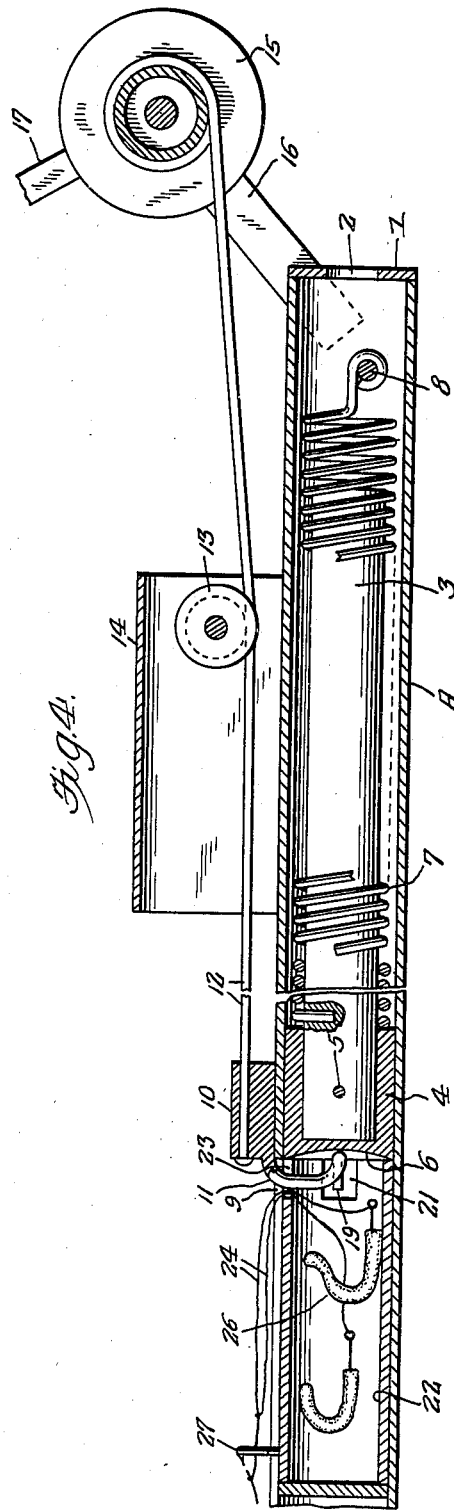
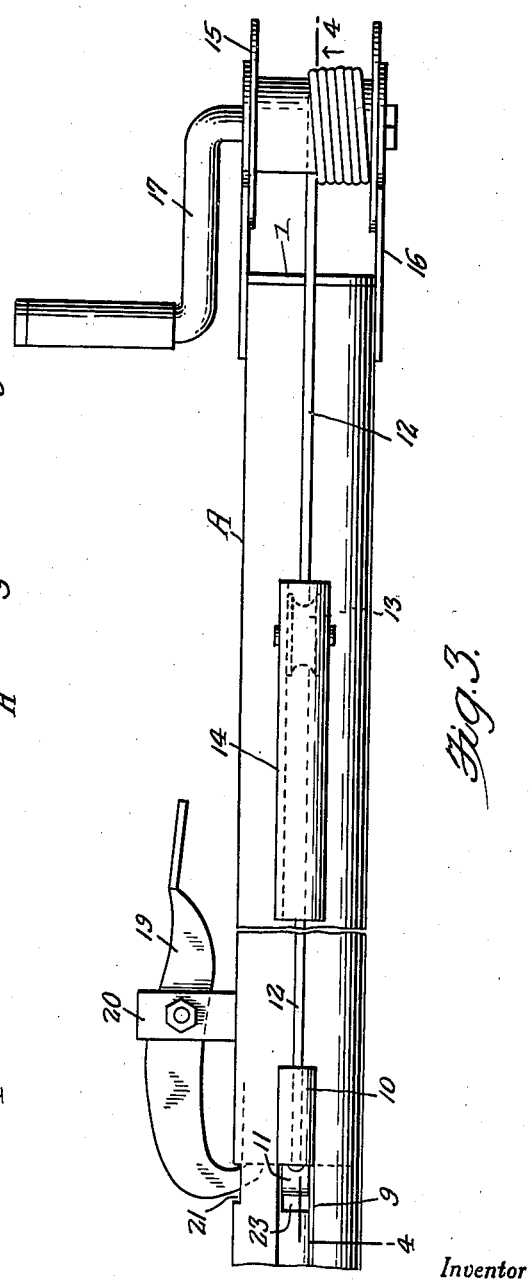
Inventor
Alfiero Martellucci
By Clarence A. O'Brien
and Hyman Berman
Attorneys Patented Oct. 15, 1940

2,218,045

UNITED STATES PATENT OFFICE 2,218,045

AUTOMATIC CASTING DEVICE FOR FISH RODS

Alfiero Martellucci, Westons Mills, N. Y.

Application January 31, 1940, Serial No. 316,652

2 Claims. (Cl. 43—19)

This invention relates to an automatic casting device for fish rods, the general object of the invention being to make the rods of hollow construction so that the leader with the hook with the bait thereon can be placed in a container which, in turn, is placed in the rod with spring actuated means manually controlled for projecting the container from the rod and throwing it into the stream or body of water so that the line is not required to be cast by hand.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side view of the improved rod constructed in accordance with the invention.

Figure 2 is a view looking toward one end of the device.

Figure 3 is a top plan view of the device.

Figure 4 is a section on the line 4—4 of Figure 3.

Figure 5 is a section on the line 5—5 of Figure 1.

As shown in these views, the rod A is of hollow construction with its forward end entirely open and the rear end is closed by an end piece 1 which may have a hole 2 therein. A rod 3 is attached to a cylindrical head part 4 by a pin 5 and the front end of this head part is formed with a recess 6. A spring 7 encircles the rod and has its rear end connected to a cross pin 8 in the handle end of the rod. The spring bears against the head 4 and tends to project the head and the rod forwardly when the spring has been pressed and then released. The major part of the rod is formed with a longitudinally extending slot 9 which terminates at the handle part and a sliding member 10 is slidably arranged on the rod and has a hook 11 at its front end which extends into the slot. A cable 12 is connected to the slide 10 and passes over a guide pulley 13 mounted in a U-shaped shield 14 attached to the handle part of the rod and then the cable is wound on a reel 15 supported by the bracket 16 from the handle end of the rod, the reel being equipped with a handle 17 so that it can be turned. When so turned and in a direction to wind the cable thereupon the cable moves the slide 10 toward the handle part of the rod with the hook passing through the slot 9 and as the hook bears against the head 4 of the rod 3 the rod and head are moved into the handle end of the rod and compresses the spring. After the member 10 has been moved rearwardly to a certain extent the head 4 is engaged by the hook forward end of a lever 19 pivoted to a bracket 20 extending from the handle part of the rod, the hook part of the lever extending through a slot 21 in the rod. Thus when the lever engages the head 4 the parts are held in retracted position with the spring contracted. A small container 22 is adapted to be inserted in the rod and one end of this container is open and this open end is formed with the notches 23 one of which has the hook 11 passing therethrough and the other the hooked end of the lever 19. Also one of these notches receives the leaders 24 of the fish line 25 so that the bait covered hooks 26 of the line are located in the container. The container is formed with an eye 27 to which the line is connected and said container acts as a sinker for the line. Thus with the rod 3 and its head 4 held in contracted position by the lever 19 the container 22 with the bait covered hooks therein can be passed into the rod until it abuts the head 4. Then when it is desired to cast, the rod is pointed in the desired direction and the lever 19 depressed so as to release the head 4 which permits the spring 7 to throw the rod and head forwardly and thus throw the container 22 with the hooks therein with considerable force from the rod and far into the water. Then by manipulating the line the hooks can be caused to drop from the container and then the container acts as a sinker. The usual reel of any suitable construction is attached to the pole as shown at R in Figures 1 and 2.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A casting fish rod comprising a tubular rod having a longitudinally extending slot therein, a bar having a head thereon slidably arranged in the rod, a spring encircling the bar and connected to the rear end of the fish rod and when expanding throwing the bar and its head forwardly, a slide having a hook part passing through the slot and engaging the head, a reel connected with the rod, a cable on the reel connected with the slide for moving the slide toward the handle end of the rod and for moving the bar and its head rearwardly to contract the spring when the cable is wound on the reel, a container having one end open for receiving the hooks of a fish line and adapted to be placed in the rod and against the head and a lever for holding the head and bar in the handle end of the fish rod with the spring contracted, said lever when depressed freeing the head and bar to permit the spring to project the same to throw the container out of the rod.

2. A casting fish rod comprising a tubular rod having a longitudinally extending slot therein for the passage of a fish line, a bar slidably arranged in the rod, a spring connected with the bar and rod for projecting the bar toward the tip end of the rod, a slide on the rod having a part extending through the slot for moving the bar rearwardly to contract the spring when the slide is moved rearwardly, a reel connected with the rod, a cable on the reel connected with the slide for moving the slide toward the handle end of the rod, a member adapted to be connected to a fish line and adapted to be placed in the rod, and a lever pivoted to the rod for holding the bar in position with the spring contracted, said lever when moved in a certain direction freeing the bar to permit the spring to project the same to throw the member connected with the line out of the rod.

ALFIERO MARTELLUCCI.